Aug. 30, 1960 R. W. POLLEY 2,951,140

THERMOSENSITIVE TAPE DISPENSING

Filed June 18, 1956 8 Sheets-Sheet 1

Inventor:
Robert W. Polley,
by Emery, Booth, Townsend, Miller & Weidner
Attys

Aug. 30, 1960 R. W. POLLEY 2,951,140

THERMOSENSITIVE TAPE DISPENSING

Filed June 18, 1956

8 Sheets-Sheet 2

Inventor:
Robert W. Polley,
by Emery, Booth, Townsend, Miller & Weidner
Att'ys

Aug. 30, 1960 R. W. POLLEY 2,951,140

THERMOSENSITIVE TAPE DISPENSING

Filed June 18, 1956 8 Sheets-Sheet 3

Inventor:
Robert W. Polley,
by Emery, Booth, Townsend, Miller & Weidner
Attys

Inventor:
Robert W. Polley,
by Emery, Booth, Townsend, Miller & Weidner
Att'ys

THERMOSENSITIVE TAPE DISPENSING
Filed June 18, 1956 8 Sheets-Sheet 5
Fig. 8.
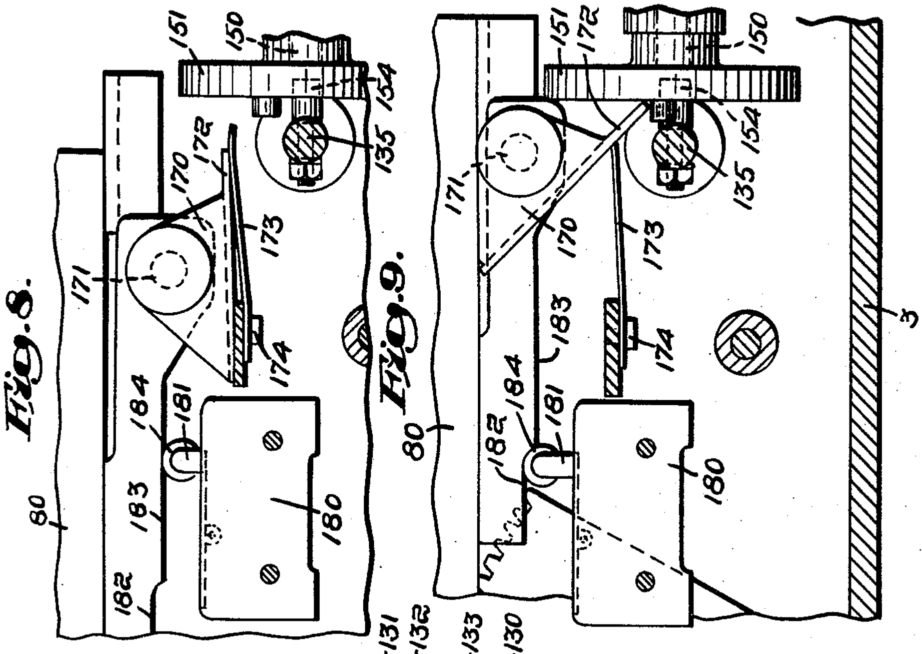
Fig. 9.
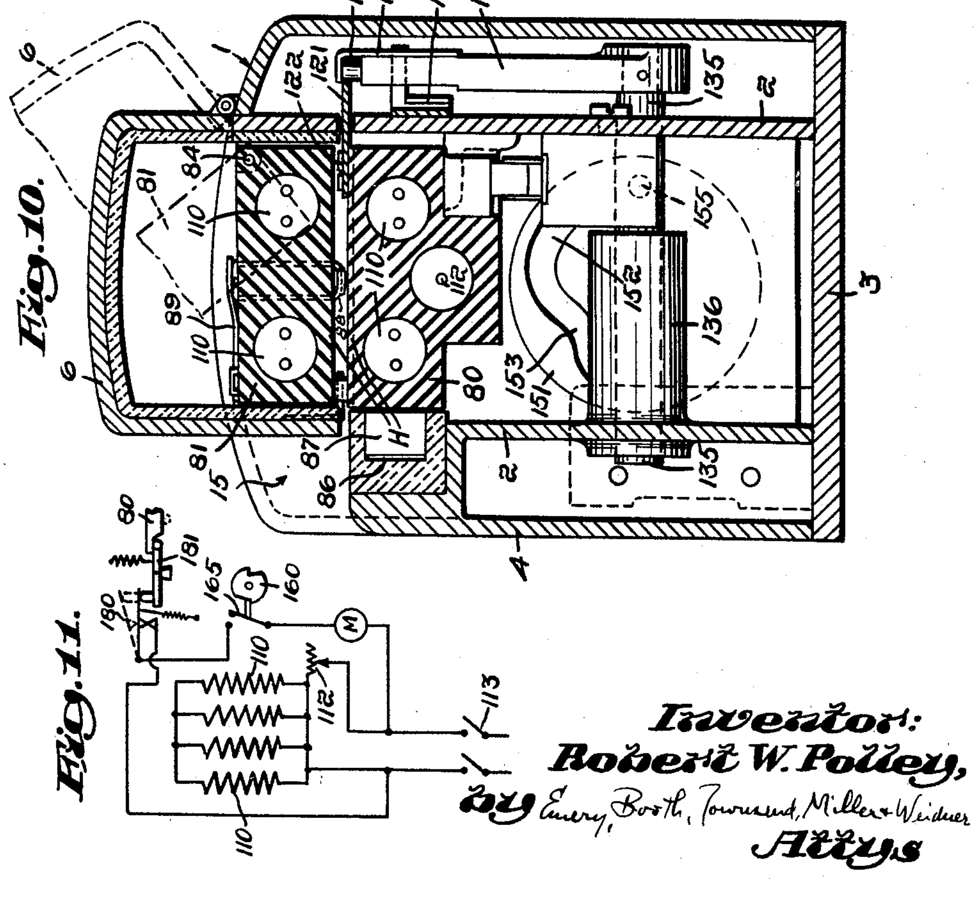
Fig. 10. Fig. 11.
Inventor:
Robert W. Polley,
by Emery, Booth, Townsend, Miller & Weidner
Attys Inventor:
Robert W. Polley,
by Emery, Booth, Townsend, Miller & Weidner
Att'ys Aug. 30, 1960 R. W. POLLEY 2,951,140

THERMOSENSITIVE TAPE DISPENSING

Filed June 18, 1956 8 Sheets-Sheet 7

Inventor:
Robert W. Polley,
by Emery, Booth, Townsend, Miller & Weidner
Attys

THERMOSENSITIVE TAPE DISPENSING

Filed June 18, 1956

Inventor:
Robert W. Polley,
by Emery, Booth, Townsend, Miller & Weidner
Attys

United States Patent Office 2,951,140

Patented Aug. 30, 1960

2,951,140

THERMOSENSITIVE TAPE DISPENSING

Robert W. Polley, Nashua, N.H., assignor, by mesne assignments, to Nashua Corporation, a corporation of Delaware Filed June 18, 1956, Ser. No. 591,844

19 Claims. (Cl. 219—19)

This invention pertains to adhesively conditioning and dispensing lengths of tape from non-tacky supplies thereof for labeling, wrapping and other taping uses. While in some respects applicable to tape and label dispensing generally, the invention is concerned more particularly with handling heat activated or heat-seal strips or tape bearing a coating of thermoplastic adhesive.

Some tapes of the class mentioned require adhesive activation and substantially simultaneous application under combined heat and pressure. The present invention while having features adapted for use with such tapes is peculiarly suited to the dispensing of tape and the like strip material having a coating which can be activated by heat and subsequently applied like a tape of the pressure sensitive or the moisture-activated types. Such coated paper and other tapes are dry or non-tacky in the supplies thereof, become usefully adhesive upon activation by heat, and possess a delay action or tack-retaining capacity enabling them to be applied by placing them against and pressing them to the desired surface or article at the convenience of the user and without undue haste. Such flexible sheet, tape, label and the like material having a coating which is non-tacky at room temperatures and which may after heat activation be adhesively secured to another article is disclosed and claimed in United States patent to Perry 2,462,029 of February 15, 1949.

In the drawings illustrating by way of example illustrative embodiments of means of the invention and whereby the methods thereof may be practiced:

Fig. 7 is a partly diagrammatic view of a portion of the means of Fig. 6;

Fig. 8 is a side elevational detail view of a portion of the tape ejector and timing mechanism of Figs. 6 and 7;

Fig. 9 is a view similar to Fig. 8 showing another position of the parts;

Fig. 10 is a cross-section as on the staggered line 10—10 of Fig. 3;

Fig. 11 is a wiring diagram of the control circuitry of Figs. 1 to 10;

Figs. 15 to 18 are schematic diagrams showing four successive stages in an operating cycle of the machine of Figs. 12 to 14, and in which:

Fig. 15 represents the ready or initial stage as between cycles, ready for operation, Fig. 16 represents an early stage in a cycle, Fig. 17 represents a further stage with the heater substantially moved in from its normal remote position and ready to receive tape, and Fig. 18 represents a succeeding stage with respect to tape heating and delivery.

Machines and apparatus of the class here concerned in general comprise a support for a continuous roll supply of the tape, and provision for moving out and delivering to the operator thermally adhesively conditioned tape lengths for subsequent application in the desired use. The invention may be embodied in any of the various types of machines of the general tape-dispensing class including the manual, the semi-automatic and the full-automatic. These may be of any preferred size, shape and design appropriate to the field of use, as upon store counters, or in shipping rooms and wherever the thermally adhesively-conditioned tape is to be employed.

Merely for the purposes of description the invention is here illustrated in an operator-controlled or semi-automatic machine generally styled similarly as in Nashua Corporation Patents 2,382,787 and 2,434,996 of August 14, 1945, and January 27, 1948, respectively. The novel features of the invention however may be variously embodied and are in no sense limited to use with known designs of machine.

Figure 2:
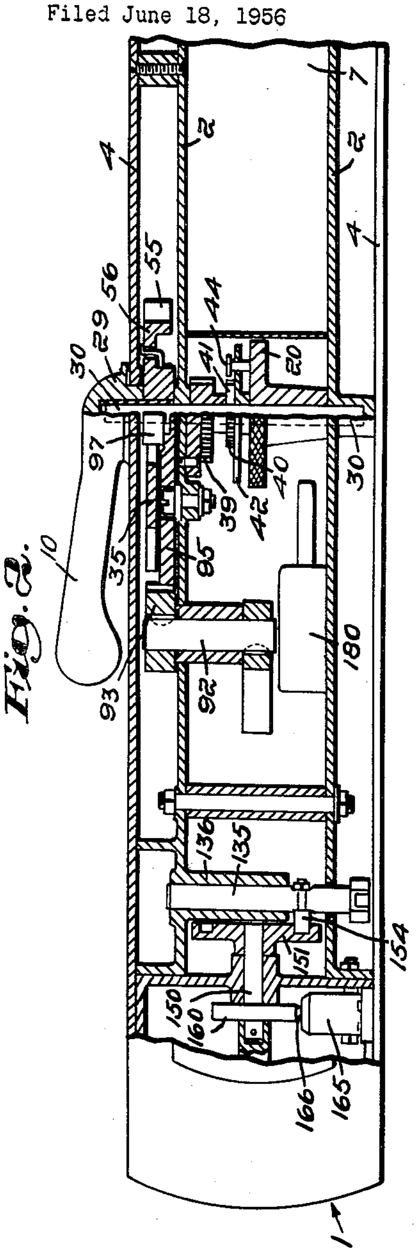
Fig. 2 is a horizontal section as on the line 2—2 of Fig. 1, looking at the upper portion of the machine from below the section level, or as though said upper portion were turned through 90° away from the Fig. 1 viewer.

Referring to the drawings in more detail, a typical installation of the invention comprises a housing indicated generally at 1 including longitudinal frame members 2, 2, Fig. 2, a supporting base portion 3 and removable or openable outer portions such as the demountable side plates 4 and a top cover shown as divided about mid-length of the machine into an end-hinged rear cover member 5 and an adjoining fore cover 6 hinged at a side; see Fig. 10. The housing provides a supporting enclosure for the mechanism and for a roll supply of the non-tacky dry heat-activatable tape T, set in a well 7.

Tape feed and attendant functions in each cycle of delivering of a thermally adhesively activated length of tape are initiated by the hand lever 10. For purposes of description said operating lever 10 will be used as identifying the "right-hand" side of the machine, that viewed in Figs. 1 and 5. Usually the operator is at the "front" end of the machine, that away from the tape supply well 7 in the "rear" portion. For a tape delivering cycle the operator swings the hand lever 10 "forward" and down, counterclockwise in Figs. 1 and 5. The tape is fed to the left in said views, and to the right in Fig. 3. The adhesively activated lengths of tape become available at the delivery station indicated generally at 15, Fig. 1, at the lever side of the machine, conveniently adjacent the operator's hand following release of the lever 10 for automatic return "rearward" to the normal or rest position of Figs. 1 and 5.

Locational and directional terms herein, such as "front," "rear," "forward," etc. are referred to one convenient position for the operator, and to the direction of tape feed from the supply, only to facilitate the description. They imply no structural or functional limitation in these respects for the apparatus and method of the invention.

In the exemplary embodiment the tape feed and severing means are in general as fully disclosed in said Patent 2,382,787, but with certain novel features and functions herein shown and described in new combination with unique means for thermally adhesively conditioning the tape.

Figures 5, 5A:
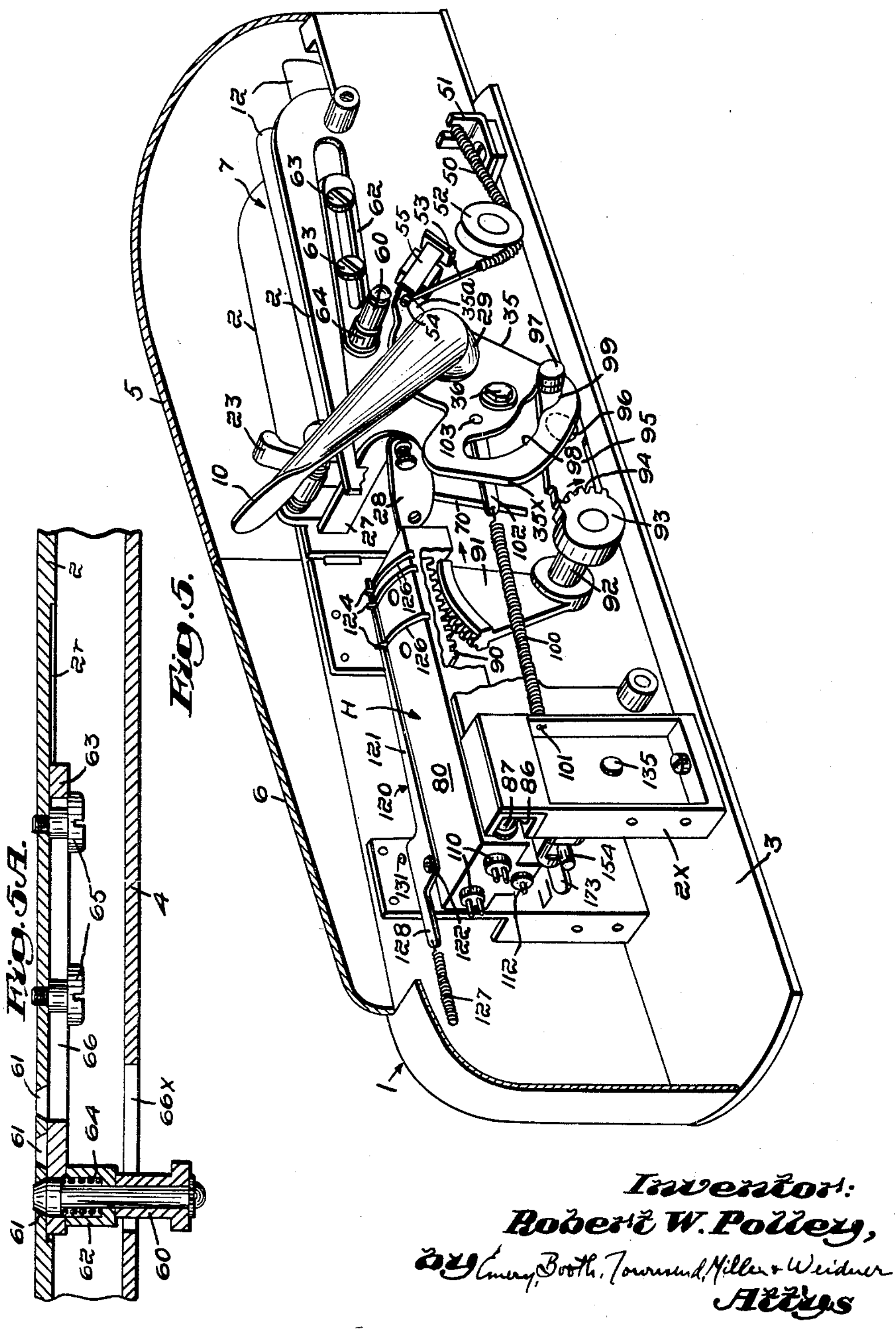
Fig. 5 is a perspective view with certain framing and cover parts omitted, showing features of the heater action.
Fig. 5A is a detail section as if on the line 5A—5A of Fig. 5, enlarged.

In the supply well 7 the tape supply rolls of different widths such as ¾ in., 1¼ in., 1½ in. are guided by adjustable side guides 12, Fig. 5. Noting Fig. 3, the tape from the supply extends between a pair of feed wheels or rolls comprising a driven roll 20 and a cooperating press roll 21. The latter is rotatably presented by a spring-loaded carrier 22 so that the rolls 20, 21 have feeding engagement with the opposite faces of the tape advanced by and between them. A finger piece 23 on the carrier affords convenient means for lifting the upper feed wheel 21 for access to the tape path. Immediately beyond the rotary feed pair 20, 21 the tape path extends between opposed guides 25, 26 and beneath a fixed transverse cutter bar 27 with which a movable blade or shear 28 cooperates to sever the tape behind the selected length fed.

Figure 1:
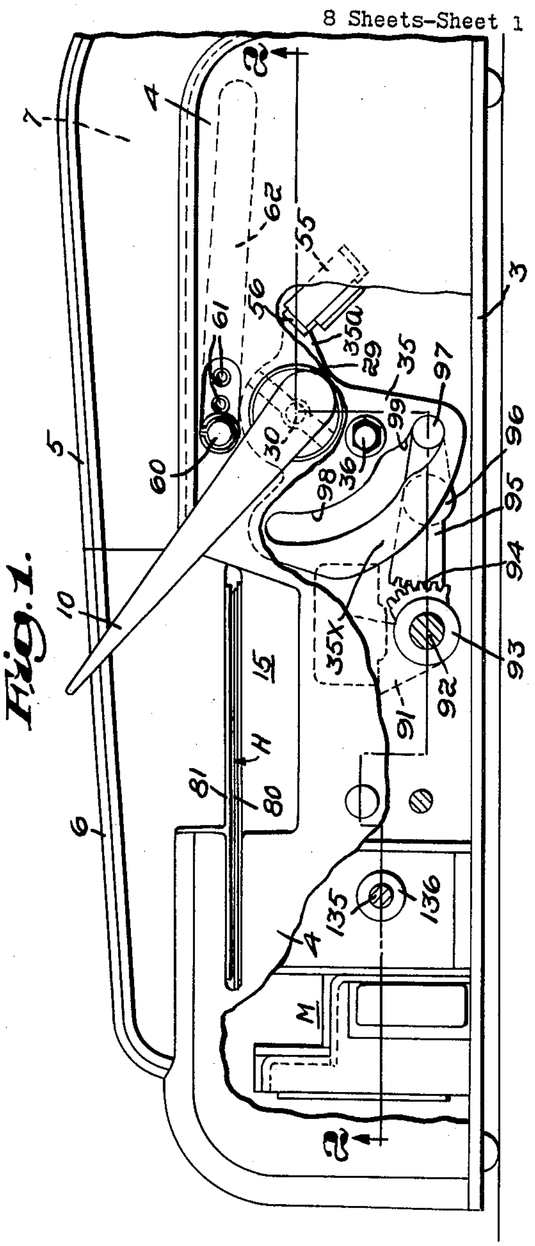
Fig. 1 is a side elevation viewing the operating and delivery side of the machine, with a portion of the outer side cover broken away.

Actuation of the feed means and of the cutter is effected by the mentioned operating handle 10, having a bearing hub 29 rotatably carried in the demountable side cover plate 4, Figs. 1 and 2. The lever hub is centrally recessed to receive loosely the adjacent end of a transverse stud shaft 30 on the longitudinal frame members 2, 2. This stud shaft 30 supports and provides rotary bearing for a series of axially aligned parts comprised in the train of drive gearing and operating mechanism.

Rotation in the tape-feeding direction is imparted to the feed roll 20 from the hand lever 10 with drive step-up such that a relatively short angular movement of the lever accomplishes the desired range of tape lengths to be fed. The inner end of the hand-lever hub 29 is removably coupled to impart angular movement about the axis of stud shaft 30 to a crank element designated generally at 35, Figs. 1, 2 and 5. A lateral stud 36 at the inner face of the crank 35 rotatably carries a traveler gear 37, Fig. 3, adapted to be swung bodily with the angular movement of the crank, along and in meshing engagement with a fixed arcuate rack 38 concentric with the crank axis, i.e. that of the stud shaft 30. Bodily travel of the gear 37 along the rack rotates it on its own axis. The gear 37 meshes with and rotates a toothed pinion 39 on the stud shaft 30. At one face of the pinion 39 and angularly fixed relative to it is a ratchet wheel 40 cooperating with a pawl 41 on a pawl carrier disc 42 rotatably mounted on the stud shaft 30, as is also the ultimately driven feed roll 20.

Figure 3:
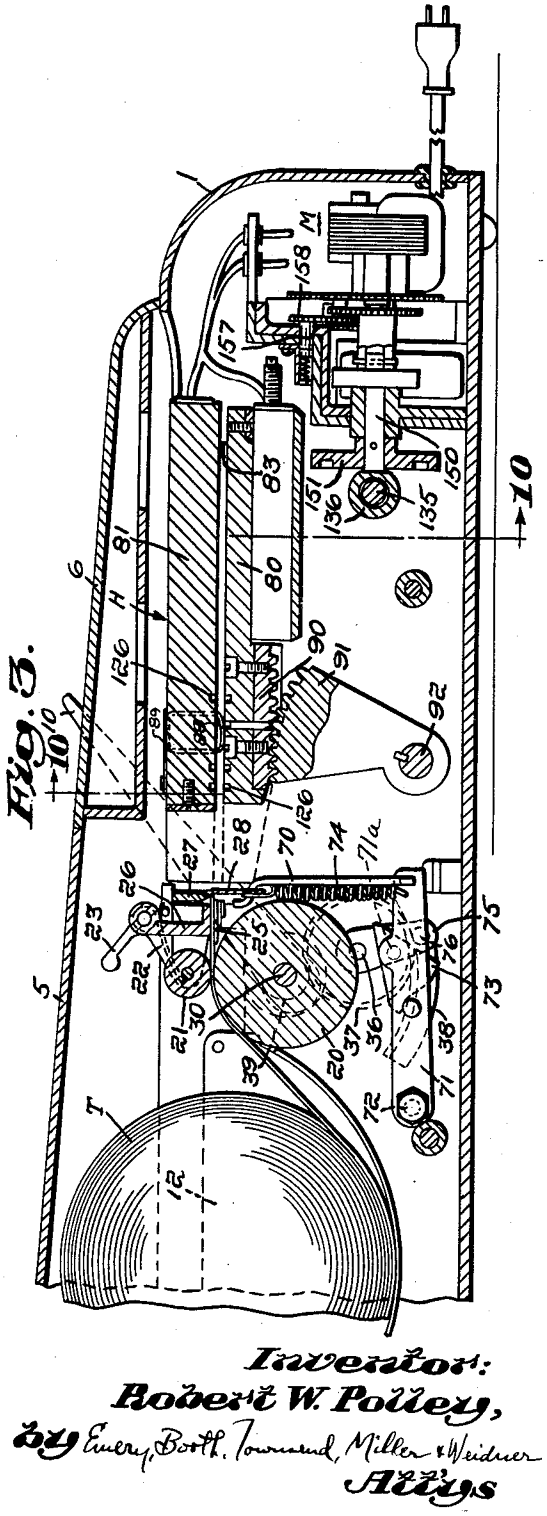
Fig. 3 is a partial vertical longitudinal section looking from the side opposite that in Fig. 1 or as though the machine were reversed endwise.
Figure 3A:
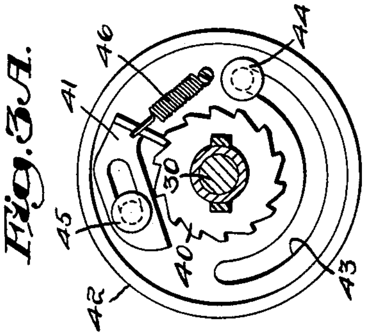
Fig. 3A is an enlarged detail elevation of an element of the tape feed drive.

As seen in the detail view, Fig. 3A, the pawl carrier 42 has a concentric arcuate slot 43 shown as approximately 180° in extent. A post 44 fixed at the adjacent face of the feed roll 20 is received in said arcuate slot 43. Said slot and post connection as between the feed roll 20 and the pawl carrier 42 affords a delay or lost-motion action such that the pawl carrier receives about a half-turn, in the tape feeding direction, before the trailing terminus of the slot 43 picks up the post 44 and positively imparts rotation to the feed roll 20.

Other delay action also desirably is afforded as by shiftably mounting the pawl 41 on and relative to the pawl carrier 42 in generally similar fashion as in Gautier Patent No. 2,290,041, the pawl 41 having a slot receiving a lateral pin 45 at the face of the pawl carrier 42. The pawl 41 is urged toward and returned to a position with the pin at one end of the slot as by a coil spring 46 secured at opposite ends to the pawl 41 and to the carrier disc 42.

The last-mentioned delay action afforded by the relative bodily movement as between the pawl and the pawl carrier is calculated to provide for assured clearance of the movable cutter blade 28 from the path of the tape prior to feed thereof. The first-mentioned time delay, as between the pawl carrier and the feed wheel 20, or said two delay actions together, provide for preparatory positioning of the normally remotely located heater or oven unit H, to be described, to ready it for appropriate reception of the tape length to be thermally adhesively conditioned. It will be understood that the one-way drive or ratchet mechanism 40–46 avoids reverse turning of the feed rolls 20, 21 during the return stroke of the hand lever 10.

Normally, between tape delivering operations, the hand lever 10 is held in up or rearward rest position, Figs. 1, 3 and 5, to which it is automatically moved, by return spring means best seen in Fig. 5. Such means includes a tension spring 50 adjustably anchored at one end to an adjustable bracket 51 on the machine frame. The spring is bent about a guide roll 52 and at the other end is attached to a link 53 pivoted at 54 on a rear radial extension 35*a* of the main crank and cam element 35.

The normal rearward or rest position of the hand lever 10, see Fig. 1, is determined by a buffering stop 55 on the machine frame engageable by a stop lug 56 on said crank-cam extension 35*a*. Selection of the desired tape length to be delivered is had by means variably limiting the stroke of the hand lever 10, preferably the forward or feed stroke thereof. This is accomplished in the example of Figs. 1 to 10 by a length selector in the form of a pull pin 60, Figs. 1, 5 and 5A, having a nose receivable selectively in any one of a series of tape-length selecting apertures 61 on the adjacent frame member 2. Such length selector pin 60 is plunger-mounted in a hollow boss 62 on a slide bar 63 longitudinally shiftable in a guide recess 2*r* in said frame member 2. A spring 64 in the boss 62 surrounds the pin 60 and urges it to seated position in the selected aperture 61. The pin-carrier bar 63 is slidably held and guided as beneath the heads of screws 65 extending through a guide slot 66 in the bar into the adjacent side frame 2. The selector pin 60 is externally accessible at a slot 66*x* in the side cover 4, Fig. 1. An intermediate portion of the pin 60 serves as a stop engageable by the front face of the stop lug 56 on the crank-cam extension 35*a*, limiting the forward stroke of the hand lever 10 according to the setting of the pin 60 in one or another of the apertures 61. These latter are appropriately positioned in calibration with the angular movement of the hand lever 10 to accord the different tape lengths such as 2, 4, 6 inches, etc., the cover plate being provided with corresponding indicia for the particular lengths available in the given machine.

The cutter means comprising the fixed and movable blades or shear pair 27, 28 also are operated from the hand lever 10. In the example shown the action of tape severance is readied during the forward or feed stroke of the hand lever and is effected automatically attending return of the lever 10 after completion of a feed stroke. The illustrated means for this purpose is like that of said Patent 2,382,787. It includes a vertical link 70, Fig. 3, pivotally connecting the free end of the movable blade 28 with the underlying end of a trip lever 71 pivotally supported on a fixed part of the machine frame as at 72. On the trip lever 71 is pivoted as at 71*a* a dog 73 rockable between limits defined by stops on said trip lever and normally held in the position of Fig. 3 by gravity and if desired by connection with the adjacent end of coil spring 74 as shown in said Patent 2,382,787, said spring 74 in the here illustrated embodiment being shown connected directly to the trip arm 71, the other end of said spring being attached to the free end of the movable blade 28. On the crank element 35, on the same stud 36 with the traveler gear 37 and angularly fast thereon except preferably with a loose connection for brief delay purposes, is a cam roll finger 75 carrying a cam roll 76 coacting with the dog 73.

During a feed stroke of the hand lever 10 rearward travel of this cam roll 76, to the left in Fig. 3, idly tilts the dog 73. This cocks the parts for actuation of the movable cutter blade 28 attendant on the return of the hand lever. As the cam roll returns, toward the right in Fig. 3, engagement with the dog 73, held from reverse tilting, lifts it and with it the trip lever 71. This causes a rapid upswing and immediate release of the movable blade 28, severing the length of tape advanced. Under the action of the coil spring 74, which is extended in the cutting movement of the blade, the parts are promptly restored to the Fig. 3 position, with the blade 28 and the trip lever 71 down and the cam roll 76 again forward of the dog 73 ready for the next cocking and cutting operation.

As explained, one form of the tape T to which the invention is applicable carries at one or the other face, or if desired at both faces, a film of thermally activatable material which is non-tacky at room temperature. Thus initially, under all usual conditions of shipment and storage of the tape, and in the form in which the tape supply rolls are introduced into the machines here concerned, the tape is non-tacky. This tape is rendered usefully adhesive by subjection to brief heating above a critical temperature. Following such heat activation the tape retains a useful adhesive status during a more or less extended time affording ample opportunity for application of the tape to the desired adhesive use such as package sealing, wrapping, label application and the like. Otherwise stated, the adhesive substance of the tape has after activation a temperature of adhesiveness lower than the initial adhesive temperature of the original film before heating, as disclosed and claimed in Perry Patent 2,462,029. While this invention is especially applicable for use with such tape it is not exclusively limited thereto, various features of the invention being adapted for use with heat-sensitizable adhesive tapes generally.

In this connection it will be appreciated that tape in the supply well 7 and along the tape path up to the severing station at 28 and in the region of the feeding and the cutting means, where the leading end of the next length of supply-connected tape normally stands at rest, should remain at "room temperature," that is, below the critical initial adhesive temperature for the tape. Nevertheless, activating heat must be so supplied that severed and adhesively activated tape lengths are available and delivered to the operator closely following each feed stroke of the hand lever 10.

In accordance with the invention this problem is solved by providing a spatial separation of the heat source H and the unfed tape of the supply. Accordingly the heat source, sometimes referred to herein as the oven or the heater assembly or unit, on the one hand, and the tape supply holding means and the tape feeding and cutting means, on the other hand, are so constructed and arranged that normally, between successive operating cycles, they are spaced apart relative to each other. Such spacing is made adequate, along with appropriate heat insulation of the heater assembly, so that the unfed tape and machine parts associated with it retain a relatively cool status, free of undesired transfer of heat from the oven whether by conductance or radiation. Such relative spacing, while for convenience herein referred to as according a normal "remote" stationing of the oven and the tape supply feeding and severing means, need not be extensive. The minimum dimension of the spacing gap varies somewhat according to the character of the tape and the size and type of machine. With avoidance of direct metallic or other heat conductance an effective air gap usually is in the range of about ½ to 1½ in. In the illustrated example of an average sized machine a spacing of approximately 1¼ in. between the heater H and the tape severing means, in the normal or rest position of the parts, has been found satisfactory.

The normally remote relative positioning of the heater means H and of the tape holding, feeding and severing means, and the bringing of them together to receive and to impart the requisite heating to the entirety of a fed tape length may be accomplished by providing for movement of either or both of the main assemblies with respect to each other. In the illustrated example, the oven element H has an in and out or up and back motion of approach and retraction toward and from a receiving or getting position with respect to the tape being fed. This travel of the oven H is made such that the selected measured length of tape is projected into and received by it over the substantial entirety of such length, including the trailing portion thereof adjacent the severing station at the knives 27, 28. Further, the construction and arrangement is such that during an initial or preparatory portion of the "forward" or operating stroke of the hand lever 10, occupying for example about a 30° arc of lever movement, the oven H is moved into appropriate tape-getting position relative to the knives and parts behind them. After tape feed and severance, upon completion of the lever operating stroke for the selected tape length, the oven automatically retracts to its normal or "remote" position, taking the fed and severed tape length with it. At the end of a calculated brief period adequate for thermally conditioning the tape, usually somewhat beyond the time for feeding and cutting the tape and retracting the oven, the adhesively-activated severed tape length is delivered conveniently to the hand of the operator.

The oven or heater assembly H is in this instance disposed in the "front" section of the machine. The preparatory relative travel, as between the heater H and the tape supply T hence is "rearward," i.e. opposite to the tape feed direction. In such prepartory movement the heater shifts from the normal "remote" position of the full-line showing in the drawings, wherein it is spaced forwardly away from the cutter station 27, 28, to a tape-getting position inward or rearward and closely adjacent said station. This inward preparatory travel of the heater is to the right in Figs. 1 and 5 or to the left in Fig. 3. Thereafter in each operating cycle, the tape is fed into the oven, severed, and the normal spacing of the oven relative to the cut-off station is restored.

The heater means or oven H comprises generally a carriage including a pair of superposed vertically spaced hot plates 80, 81. These are held in adjustably spaced vertical relation as by threaded spacer posts outside the tape path, one of which is seen at 83, Fig. 3. The upper plate desirably is hingedly mounted with respect to the lower plate 80, as indicated at 84, Fig. 10, so it may readily be swung up as there shown dotted, after raising the fore top cover 6 for access to it. The hot plate pair 80, 81 is movable as a unit to receive and thermally activate the tape in the oven or heating chamber provided by and between the plates. Accordingly one of the plates, herein the lower plate 80, is provided with supporting guide means on the machine frame. Noting Figs. 5, 6 and 10, such means includes longitudinal guide channels, one of which is seen at 86, on extensions of the frame members 2, open opposite the lower hot-plate 80 to provide a track for one or more guide rollers 87 on the respective sides of said plate at convenient points along it.

The stated preparatory positioning movement for the oven H, 80, 81 is effected through drive connections correlated with the operating lever 10. These connections comprise in the illustrated example, see Figs. 3 and 5, a toothed rack 90 at the underface of the lower plate 80 in supported meshing engagement with a toothed segment 91 fast on a cross shaft 92, see also Fig. 3, journalled in the machine frames or suitable bearing brackets thereon. Also fixed on the cross shaft 92 is a segmental pinion 93 meshing with a like gear element 94 at the adjacent end of a rock arm 95. The latter has fixed pivotal support between its ends on the machine frame as at 96 and at its other or rear end carries a cam roll 97 received in a cam slot having high and low parts 98, 99, in an enlarged extension 35*x* of the combined crank and cam element 35 mentioned.

In the normal or rest position of the parts, as in Figs. 1, 3 and 5, the cam roll 97 stands in the eccentric low part 99 of the slot. During a first portion of the forward stroke of the hand lever 10, counterclockwise in Figs. 1 and 5, the cam roll 97 rides up onto the concentric high or dwell portion 98 of the cam slot, tilting the rock arm 95 up at the rear end and down at the front end as indicated by the arrow on Fig. 5, turning the segment pinion 93 clockwise and with it the shaft 92 and gear segment 91. Accordingly the heater assembly H is bodily moved in to close proximity to the tape severing station 27, 28, toward the rear of the machine and oppositely to the tape feed direction, herein to the right in Fig. 5 (to the left in Fig. 3), into tape-getting position. Such movement is appropriately limited by the formation of the cam slot, the concentric dwell portion 98 of which permits further movement of the hand lever 10, to feed the selected length of tape, while the heater H remains at the described inward or tape-getting position.

Automatic retraction of the heater oven H herein takes place upon release of the hand lever 10 following a tape-feeding actuation. It is accomplished by the hand lever return spring 50 described, preferably supplemented by another tension spring 100, Fig. 5, anchored at the front end to a fixed part as at 101, with the other end attached to a link 102 pivoted to the crank and cam element 35, 35*x* as at 103, at the opposite side of the hand lever axis 30 from the attachment of the spring 50. Thus both springs are tensioned during the forward or operational stroke of the hand lever 10 and on release of the latter contract and impart return motion to the parts including the heater-shifting train 90—97.

The hot plates 80, 81 comprised in the oven or heater H are provided with means for maintaining them at a temperature suitable for adhesive activation of the tape within a relatively brief time interval. Such means preferably is electrical and may comprise one or more coils or electrical resistance heater elements for each hot plate. In the example of Figs. 1 to 10 two such heater elements 110 are shown embedded in each heater plate 80 and 81; Figs. 5 and 10. They are located and arranged to afford substantially uniform heating over the entirety of these areas of the opposed upper and lower faces of the hot plates 80, 81 between which the tape is projected or inserted by the described feed means. The several heater elements 110 are electrically connected in parallel, as diagrammatically represented in Fig. 11, and in series with a controller thermostat 112, shown in the lower plate 80, and which may be adjustably set to maintain the oven temperature at the correct level for adhesively sensitizing the tape. The heater elements 110 and thermostat 112 along with the other electrical parts are connectible with the power supply as by a conductor cord C, Fig. 3, subject to closing of the main switch 113 on the machine or in the cord. Desirably the conductor connections at the several heater elements are of the plug-in type as indicated for example in Figs. 5, 6 and 10, easily removable for convenient access to the operational parts for inspection and maintenance purposes.

To insure proper thermal conditioning of the tape lengths to bring them to the adhesively activated status and then to eject or deliver them to the user the invention further includes timing means and tape ejecting means whereby said functions are accomplished automatically.

Figures 5, 6:
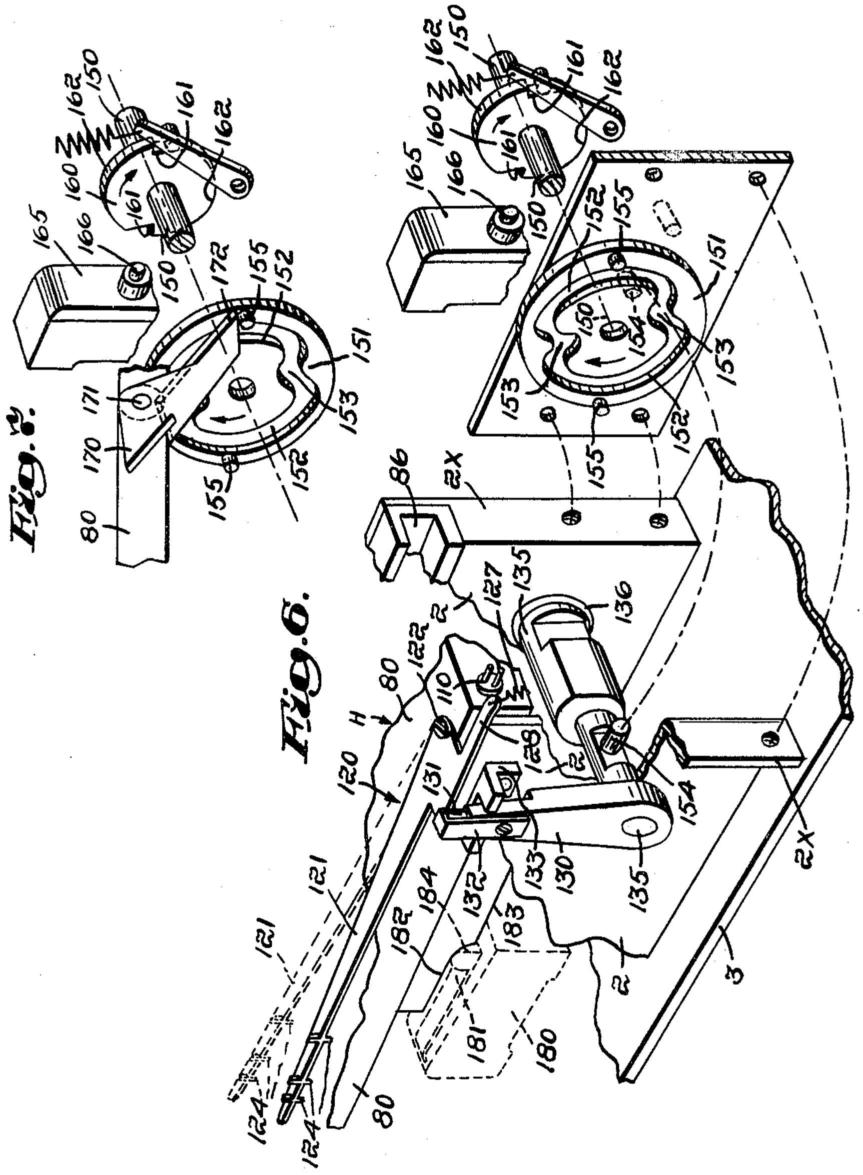
Fig. 6 is a perspective view of an ejector and timing mechanism, with parts exploded for clarity.

Such tape delivering means comprises an ejector device designated generally at 120, Figs. 5 and 6, whereby the adhesively conditioned severed tape lengths are moved out from the oven H, herein transversely of the tape feed path. A substantial leading portion of the tape is thereby conveniently delivered to the operator's hand adjacent the feed lever 10, where the hand is naturally positioned following release of the hand lever. Thus in the illustrated embodiment the delivery station 15 for the readied tape lengths is at the hand-lever side of the machine, the "right" side in the terms of reference here used.

The ejector assembly 120 comprises an ejector proper shown as an elongate finger 121 normally standing to one side of the tape position in the heater, and of a length approximating that of the maximum strip length to be handled. This ejector 121 is pivoted as at 122 upon the top face of the lower hot plate 80 to swing in a horizontal plane across it. It is of a thickness somewhat less than the vertical spacing between the hot plates, and it is adapted for edgewise engagement with the tape. By way of further insurance of the ejecting function the ejector finger 121 may be provided with one or more finger-guiding and tape-pusher pins 124. These project above and below the plane of the tape and of the flat ejector finger 121. They ride in corresponding arcuate slots 126, Figs. 3 and 5, in the opposed faces of the hot plates 80, 81. Three such guides and pusher means 124, 126 are represented in Figs. 5 and 6, adjacent the tape-receiving end or mouth of the heater oven H. Their number, shape and arrangement along the ejector 121 may be varied for different sizes and weights of tape, ranges of feed length and other factors.

Normally the ejector 121 is yieldably held in outboard position, out of the way of the tape, as in Fig. 5 and in full line in Fig. 6, as by a coil spring 127 anchored at one end to a fixed part of the machine frame and attached at the other end to a laterally offset tail piece 128 on the ejector 121.

At the appropriate time following full return of the oven or heater unit H to the normal rest and delivery position as in Fig. 5, that is, toward the "front" of the machine of the exemplary embodiment and removed from the tape supply, the ejector 121 is actuated to kick or thrust the tape to a projective position relative to the plates 80, 81 of heater H, herein laterally outward, so as to be readily grasped by the operator.

Such ejective delivery is accomplished by an actuator or push lever 130, Figs. 5, 6 and 10, having at the upper end a vertical roll 131 abutting the outer edge of the ejector 121 at a point forward of the pivot 122 thereof in the rest position of the heater H. The actuator lever 130 is arranged for bodily movement in and out laterally of the machine to impart a tape-ejecting sweep to the ejector finger 121, to a position substantially as shown dotted in Fig. 6, with prompt return by spring 127. The actuator roll 131 is free to turn on a vertical axis about the reduced upper end of the actuator 130 where it is held in place by an overhung retainer piece 132 attached to the actuator. Said roll 131 normally serves as a stop for the outboard position of the ejector 121. The actuator 130 preferably does not partake in the shifting motion of the oven H lengthwise the machine, and as shown is restrained in said direction but guided for in-and-out movement laterally of the machine in a guide bracket 133 on the adjacent side frame 2. The rotatable sleeve or roll 131 on the actuator 130 enables the latter to maintain abuttive contact with the ejector 121 with a minimum of friction during travel of the hot plate 80 on which said ejector is carried.

For operation of the ejector 121 the actuator 130—131 is mounted on a transverse shaft 135 slidably supported in a bearing boss 136, Figs. 2, 6 and 10, on one of the frame members. Automatic operation of the actuator shaft 135 is effected at appropriate times for tape ejection by power means and controls housed in the machine, herein at the "front" portion. These comprise a fractional-horsepower motor and reduction unit M, Figs. 1, to 3, operating an output shaft 150 in half-revolution cycles.

As seen in Fig. 3 and more particularly in the exploded views Figs. 6 and 7, the motor-driven shaft 150 has fixed on it a face cam 151 presenting a continuous cam track having two similar lobes or half-portions 152, 152 each including in 180° spaced relation a relatively steep actuating portion 153, 153 with intermediate longer dwell portions. On the described slidable actuator shaft 135 is a radially projecting cam follower 154 received in the cam track 152, 153 as indicated by the dash lines on Fig. 6. The actuating portions 153 of the cam slot are effective in coaction with said follower 154 to impart the described tape-ejecting thrust to the ejector 121 by causing the actuator shaft 135 and with it the actuator 130 to shift axially, crosswise of the machine and the tape path, in one and the opposite direction, when the tape is adhesively conditioned for delivery.

The face cam 151 also has at the track face a pair of axially projecting 180°-spaced cam pins 155, 155. Means on the heater unit H engage one of these pins 155 upon retraction of said heater unit H to normal rest position and thereby accords to the shaft 150 a preliminary switch-operating rotation, in the order of about 5°. Said brief turn of the shaft 150 conditions the motor M to time and effect the ejector operation, preferably subject to means insuring that such operation can occur only under full retraction of the heater unit or oven H.

For controlling half-rotation cycling of the motor-unit shaft 150 there is also fixed on said shaft an edge cam 160, Figs. 6 and 7. This governs a normally open microswitch 165 disposed in the motor circuit. Said edge cam 160 has depressions 161 spaced apart 180°. When either of these comes opposite the operating plunger 166 of the microswitch 165 the latter opens to terminate a cycle. It remains open until the shaft 150 again receives the described switch-closing turn, by retraction of the oven H in the next manually effected tape feed operation, bringing one of the intermediate higher portions 162 of edge cam 160 closingly opposite the switch plunger 166. A spring-loaded detent 167 serves to brake the cams at the described positioning.

As stated, means cooperable with the described cam pins 155, 155 to effect said switch-closing small-degree turn of shaft 150 are provided on the shiftable oven or heater assembly H. Referring also to Figs. 8 and 9, the lower hot plate 80 of the oven has hung thereon a dog 170 pivoted as at 171 and having at one end a cam finger 172. In Fig. 8 the oven H is shown in the inward shifted or tape-getting position. At such time the dog 170 is turned and held up by a leaf spring 173 secured at one end as at 174 to a fixed part on the machine frame. As the oven retracts to its normal spaced or "remote" position of Fig. 9 the cam finger 172 of the dog 170 abuts the face cam 151. Further retracting movement of the oven then tilts the dog down to the Fig. 9 position. In so tilting the dog finger 172 engages the adjacent one of the cam pins 155 on the face cam 151. This turns said cam 151 and with it the shaft 150 and the edge cam 160, through the mentioned short turn of 5° or thereabouts. Thereby the cam depression 161 previously opposite the switch plunger 166 moves away from it and the following higher cam portion 162 closes the switch 165.

Subject to the further control to be described the foregoing preliminary or switch-closing turn of shaft 150 establishes the motor circuit and readies shaft 150 for a half revolution by the motor M, until the other depression 161 of the edge cam 160 comes opposite the switch plunger 166 to again open the circuit at switch 165 and halt the motor and shaft 150. In the course of each such half revolution of the shaft 150 the face cam 151 times and effects the tape ejector action already described.

As mentioned, further control means desirably is provided whereby the action of delivery or ejection of the thermally adhesively activated tape lengths is coordinated with correct relative positioning of the heater unit H and the tape supply. Such means as herein illustrated so controls the motor circuit that the movable element, i.e. the oven or heater unit H in this example, must have returned substantially or fully to its normal position spaced from the severing station 27, 28 and the remaining tape supply.

As best seen in Figs. 6, 8 and 9, such further control comprises another microswitch 180 on a stationary part of the machine, adjacent the travel path of the heater unit H. Normally, in the retracted position of said heater unit or oven as between successive operating cycles of the machine, Figs. 6 and 9, this switch 180 is closed. At such time its spring-pressed operating plunger 181 is elevated, as in said Figs. 6 and 9. The lower hot-plate 80 of the heater H is provided with a longitudinal two-level cam formation including high and low portions 182, 183. The switch plunger 181 carries a cam follower roll 184 against which the cam 182, 183 tracks in the travel of the heater assembly H. Normally the high part 182 of the cam is opposite the switch plunger 181 and the latter is in "up" or circuit-closing position, Figs. 6 and 9. As the heater H moves up to tape-getting position, in the first part of an operating stroke of the hand lever 10, the lower cam part 183 rides over and depresses the switch plunger 181. This opens the circuit and holds it against closing so long as the heater H is out of normal retracted or rest position.

As the heater H returns to said position, moving from left to right from the Fig. 8 position to that of Fig. 9, the higher cam part 182 comes opposite and permits the switch plunger 181 to rise. This triggers the operation of the motor unit M for actuation of the tape ejector mechanism, the motor circuit being conditioned for such operation through closure of the normally open microswitch 165 previously described. As indicated schematically in the wiring diagram of Fig. 11 the two switches 165 and 180 are in series and ejection of the tape can occur only with both of them closed. Thus the supplemental control switch 180 in the embodiment of Figs. 1 to 11 prevents ejector operation until the heater assembly H is fully retracted, and affords a measured time interval for heating of the tape as determined by the motor-driven turning of the shaft 150 and the ejector cam 151.

From the drawings in connection with the above description of the Figs. 1 to 11 embodiment of the invention it will be seen that the heater unit H with the fed and severed length of tape therein is caused to retreat toward or substantially to its retracted or normal rest position away from the severing station 27, 28 before ejection of said tape can occur. The face cam 150 starts its heater-timing and ejection-effecting operation only when the high part 182 of the heater cam returns opposite and releases the plunger 181 of the microswitch 180 to motor-circuit closing position and after the heater-unit return has first conditioned the circuit for motor operation by the described short turn of the cams 151 and 160 which closes the other microswitch 165. Thus correct positioning of the parts for tape ejection is assured.

An appropriate tape heating time interval, which at the thermostatically maintained appropriate temperature of the oven or heater unit H is generally about one to a few seconds, is enforced and measured by whichever dwell portion 152 of the face cam 151 is then in control. Then as the next adjacent actuating portion 153 of the said cam comes opposite the follower pin 154 of the ejector actuating shaft 135 of the ejector 130 is moved sharply laterally of the machine, noting particularly Fig. 6, and swings the ejector 121 in the direction to deliver the tape projectively at the delivery station 15, Fig. 1, to the hand of the operator. Simultaneous turning of the edge cam 160 brings a depression 161 thereof again opposite plunger 166 of the microswitch 165 and opens the latter to terminate the operating cycle. Overrunning of the motor M is provided against by suitable brake means such as illustrated at the right in Fig. 3 wherein a spring-pressed brake plunger 157 on a fixed part of the machine framing engages the face of one of the gears 158 of the reduction train included in the motor and reduction unit M between the motor and the shaft 150.

Figure 4:
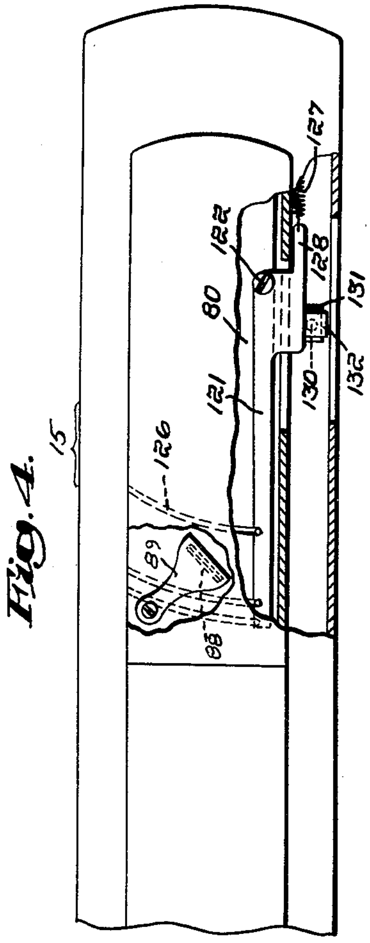
Fig. 4 is a partial top plan corresponding to the Fig. 3 position of the machine with parts broken away.

To retain the thermally adhesively conditioned tape length in delivery position for grasping by the operator, more particularly as to the shorter lengths of tape which might occasionally be dislodged from the machine, I may provide frictional tape retainer means as shown for example in Figs. 3, 4 and 10. This comprises a lightly spring-pressed device herein mounted on and extending vertically through the upper hot plate 81 of the heater unit. It includes a foot 88 with legs extending freely up through the hot plate 81 and secured at the upper face of the latter to a down-pressing leaf spring 89 on the plate. This frictional retainer or brake device, located preferably nearer the receiving mouth of the heater H and hence adapted to rest on the trailing end of the advanced tape of whatever length, is vertically yieldable for feeding of the tape below it and into the heater unit. It applies a light ejector-resisting pressure to the tape, adequate to hold it for grasping by the operator as the leading end of the tape is swung outwardly by the ejector.

It is noted, particularly with reference to Figs. 5 and 6, also Fig. 3, that the ejector actuator and control means including the motor and reduction gearing, the rotary cam means and the switch associated with them are constructed and arranged as a sub-assembly unit readily demountable as such, facilitating assembly and maintenance of the machine.

Figs. 12 to 18 illustrate certain modifications in accordance with the invention. In general and except as otherwise stated the main structure may be the same as in the preceding views, like parts bearing the same reference numerals as previously. In some instances corresponding parts involved in the modification have the numerals increased by 100.

Figure 12:
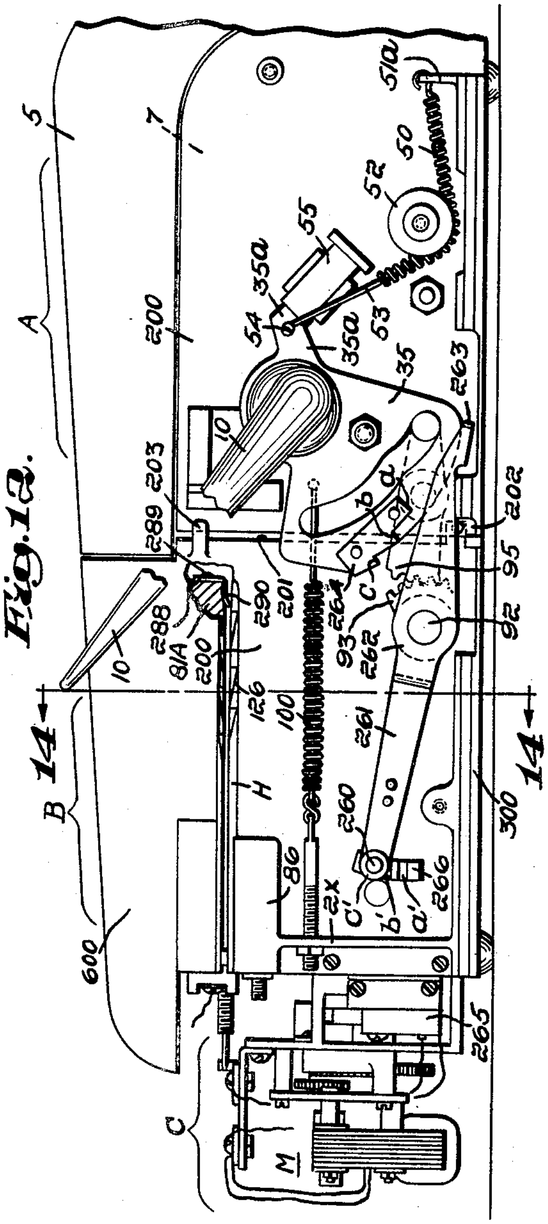
Fig. 12 is a view corresponding generally to Fig. 1 showing a modified embodiment of the invention.

The machine as represented in Fig. 12 comprises three main sub-assemblies, units or sections A, B and C. Section A includes in general the tape-supply holding, feeding and severing means including the rear cover portion 5 and the tape roll well 7, the feed lever 10 and the tape feeding and severing elements associated with it. Section B, sometimes referred to as the "hot section" comprises the heater means or oven H and its movably supporting, guiding and operating means, also in this instance the tape length setting device, while section C again comprises the ejector actuating motor and drive unit, ejector cam and an associated control switch. Each section A, B and C is constituted as a conveniently detachable sub-assembly. Further to assist in maintaining the elements of section A at relatively cool normal ambient room temperature the main side frames 200 are divided in substantially the vertical transverse plane and are constructed and arranged to provide a heat insulative air gap between them as indicated at 201. In the coordinated assembly of the machine as a whole the section A and B are longitudinally aligned and rigidly secured together and upon the base 300 as by interengaging ears or brackets and tie rods as seen for example at 202, these cooperating with one or more relatively small aligning projections as at 203. Thus by means of the heat insulative gap 201 between the tape holding section A and the heater section B the parts concerned with the non-activated tape in the supply thereof and along the tape path through the feed and severing means are in effect insulated from the heat source H both conductively and as to radiation.

Figure 14:
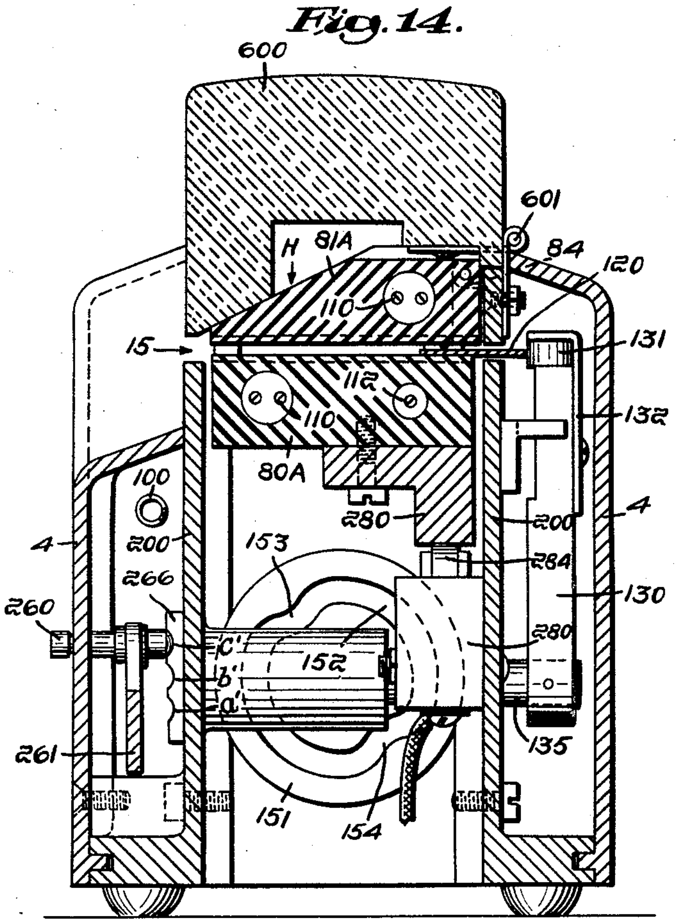
Fig. 14 is a vertical section on the line 14—14 of Fig. 12 and corresponds generally to Fig. 10.

Referring now also to Fig. 14 in connection with Fig. 12, a preferred structure and arrangement for the oven and the cover member 600 of the heater section B is there represented. For added comfort and protection for the hand of the operator in grasping the lengths of adhesively activated tape projected at the delivery station 15, the upper hot plate 81A adjacent that station is of reduced thickness. This enables the cover 600 to be brought down onto or into close proximity to the heater and to provide with the underlying frame portion 200 a tape exit at 15 of limited dimension vertically, excluding the operator's fingers from unintentional direct contact with the heater plates 80A, 81A. Additionally to afford for the cover 600 a relatively cool status despite its proximity to the heater means H, the cover is constructed as a relatively massive block of a heat insulative material such as that used for oven insulation and for structural members in low temperature installations. One example of such material found effective for the purpose is that commercially available under the trademark "Marinite," a rigid sheet material made from asbestos fiber and an inorganic binder. A mass of such material is molded or otherwise formed to the shape and dimensions substantially as illustrated in Figs. 12 and 14 and hingedly connected to a side member 200 of the section B as at 601 similarly as in the preceding views. The modified top hot plate 81A is itself separately hinged as at 84. By reason of the described construction the cover 600 may press in close covering proximity to the heater means or in actual contact with the top plate adjacent the tape delivery station 15, as seen in Fig. 14, yet at operating temperature of the heater H the cover remains relatively cool externally, to such extent that the operator's hand may engage or rest upon it without discomfort.

Fig. 12 also illustrates another form of frictional retainer or brake device for the delivered tape lengths. In this instance an L-shaped spring member 288 is secured at the inner end face of the top heater plate 81A as by one or more screws 289, said member including a spring foot 290 adapted to apply light retaining resistance upon the upper face of the tape length being ejected. Said screw or screws 289 may serve also as adjustable limit stops, in cooperation with the fixed blade 27 or other fixed part, for the in or approach travel of the heater H. In the example of Figs. 12 and 14 it is noted also that the upper and lower plates 80A, 81A of the oven are shown with but a single heater element 110 for each of them, disposed respectively at opposite lateral portions of the oven as a whole, such arrangement being found adequate in most instances. The temperature-controlling thermostat 112 may be located at any convenient position in the heater H, for example as seen in Fig. 14.

Figure 13:
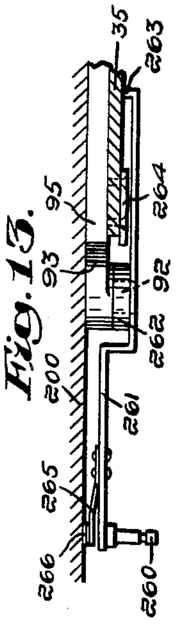
Fig. 13 is a detail plan view of a feed-length selector means of Fig. 12.

Another form of tape length selector is represented in Figs. 12 to 14. Here the finger piece 260 movable by the operator to select as between the several tape feed lengths available is disposed on the machine section B, at an easily viewed location out of the way of the operator's hand in manipulating the hand lever 10. The setting piece 260 which as in the machine of Figs. 1 to 10 projects accessibly out through the adjacent side cover 4, Fig. 14, is at one end of an elongate stop lever 261 having a bearing hub 262 intermediate its ends for rocking support on the cross shaft 92 on which the oven-shifting segment 93 is mounted. The other end of the stop lever 261, shown laterally offset, has a hook-like stop 263 adapted to engage selectively with any one of a series of abutment stops *a*, *b*, *c* on the crank and cam element 35, integral with it or on an adjustably secured block 264 thereon. The fore end of the selector lever 261 carries at the inner face a spring detent 265, Fig. 13, adapted to engage and releasably hold the stop finger opposite any selected one of a series of notches *a'*, *b'*, *c'* on a rack 266 fixed on the adjacent side frame 200.

In the illustrated position of Fig. 12 the selector is set for maximum length, with its stop 263 disposed in the path of the normally most remote stop *c* of the series. Under the other settings of the finger piece 260 at the notches *b'* and *a'* corresponding with stops **264*b* and 264*a* the feed stroke of the hand lever 10 is correspondingly shortened; see also Fig. 14. As in the previous figures, the side cover of the machine desirably carries selective setting indicia calibrated in available tape lengths, such as 2, 4, 6 in., etc. In this example the direction of abuttive engagement of a stop 264*a***, *b* or *c* with the selectively positionable stop 263 of the selector is along a line approximating the longitudinal axis of the selector lever 261. Thus the stopping stress substantially parallels the lever, with resultant minimum turning moment to disturb the given length setting.

In the Fig. 12 to 18 embodiment the heating period and tape ejection timing is effected under electrical control in which the functions of certain means of Figs. 1 to 11, including particularly the heater-carried trip device of Figs. 8 and 9 for preliminarily conditioning the ejector motor circuit, are accomplished electrically. For this purpose microswitches 265, Fig. 12, and 280, Fig. 14, corresponding to the switches 165 and 180 of Figs. 1 to 11, again disposed in series, are of the double-throw type and arranged the one to make and the other to break in either of two alternative positions.

As best explained in conjunction with the schematic circuit diagrams Figs. 15 to 18, noting also Fig. 14, the switch 280 associated with the lower plate 80A of the heater has two opposite circuit-making points referred to as upper and lower merely for identification on the diagram. A one of these, the upper point of the diagrams, the switch is "normally closed," leaving the other point "normally open," as indicated by NC and NO on the diagrams. The term "normal" as here used refers to the rest position of the machine, that occupied between operating cycles, upon completion of one cycle and in ready status for performance of another cycle.

Similarly the microswitch 265 associated with the ejector timing and actuating cam unit 151, 160 has two poles distinguished as left and right on the diagrams. At one of these, that at the right, the switch stands "normally closed" as indicated by NC, while with respect to the opposite pole it is "normally open" as indicated by NO. As in the previous example operation of the cam motor M occurs only when a motor circuit is completed through both switches. But in Figs. 12 to 18, for motor operation one or the other switch must assume an "out of normal" position; with both at "normal" one being "normal closed" and the other "normal open," the circuit is open; with both "out of normal" the circuit again is open; with the first returned to "normal" and the other remaining "out of normal," the circuit is closed; with both returned to "normal," the circuit again is open. Thus the effective actuation, to make or break the circuit as appropriate, is performed alternately and in succession by the two double-throw switches.

Figure 15:
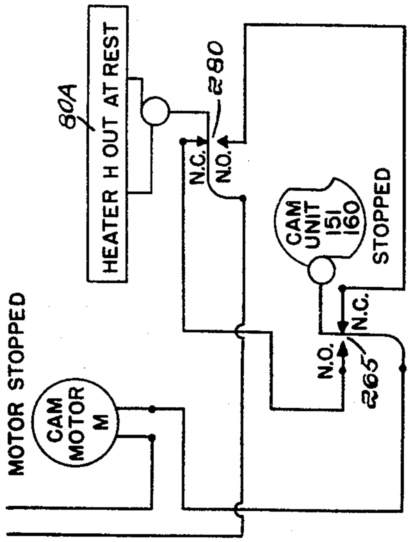

In the schematic diagrams, Fig. 15 represents the at rest position of the machine, as between cycles. It is assumed that the main on and off master switch on or adjacent the machine is on, so that the plates of the oven H are at operating temperature and the illustrated control circuits are subject to the power supply. Thus in Fig. 15 switch 280 operable by the heater is in the initial upper or NO position while the switch 265 operable by the edge formations of the cam unit 151, 160 is in the initial right-hand or NC position. The cam motor and the cam unit are stationary by reason of the open circuit condition at the switch 280.

Figure 16:
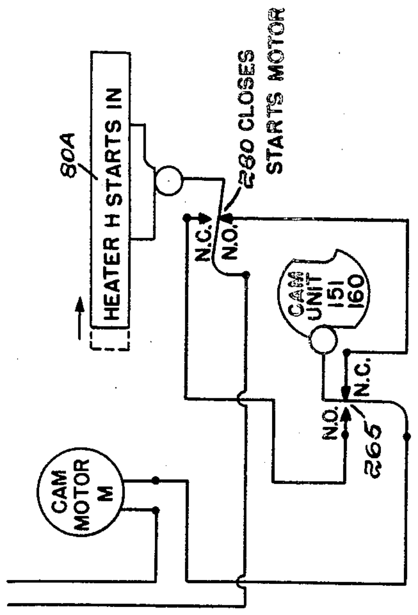

Fig. 16 represents the beginning of an operating cycle, under depression of the manual operating lever 10. Through the described gear and rack drive means the heater H starts its movement of approach inward toward the tape feeding and severing station 27, 28. In such movement the lower plate 80A of the heater immediately depresses the actuator of switch 280 down to the NO side, closing the motor circuit.

Figure 17:
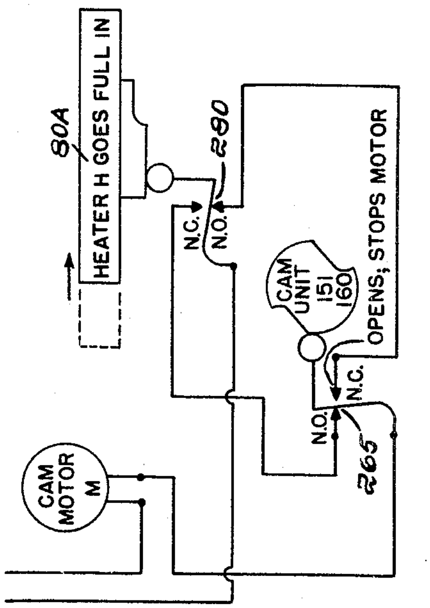

Progressing to Fig. 17 showing further travel of the heater in the tape getting direction, the cam unit 151, 160 has turned through a small angle to bring a high portion opposite the actuator of the switch 265. This throws said switch 265 leftward to the NO position, reopening the circuit and halting the motor and cam unit, but leaving the circuit conditioned for re-activation upon outward return of the heater H.

Figure 18:
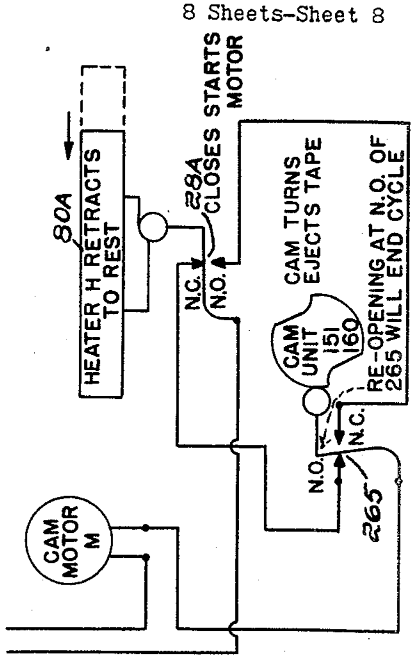

In Fig. 18 the feeding of the tape into the heater H under full selected-length depression of the hand lever 10 has been accomplished and said hand lever has been released. The heater H accordingly automatically retracts outward to its rest position shown in full line in Fig. 18. Here the low or non-depressing part of the heater cam is again opposite the actuator of the switch 280 which accordingly rises to the NC position, closing the circuit and restarting the cam motor M. The cam unit 151, 160 accordingly turns through the full extent of the high portion then opposite the follower roll of the actuator of the other switch 265. This dwell portion of the cam times the interval in which the severed length of tape remains heat-subject in the oven and after such tape-sensitizing interval effects the described operation of the ejector device 120, delivering the thermally adhesively sensitized length of tape to the hand of the operator. Then as the next notch or low portion of the cam unit 151, 160 comes opposite the actuator of switch 265 the latter is restored rightward in Fig. 18 to its NC position. This reopens the circuit and terminates the operating cycle with the several control elements restored to the initial position of Fig. 15 ready for the next succeeding cycle of feeding, severing, thermally adhesively conditioning and delivering a selected length of tape.

From the foregoing it will be understood that under the method and apparatus of the invention thermally activatable adhesive tape is delivered from a supply to the hand of a user, in selected lengths and adhesively conditioned ready for application in the desired packaging, labelling and other use. In coordination with the steps of feeding and severing selected lengths of the thermo-activatable tape these are adhesively conditioned in the course of an operating cycle which includes effecting relative approach and retreat as between the tape heater means and another tape-engaging instrumentality of the machine which it is desired to keep relatively cool. Such operating cycle further comprises the subjection of the tape length to be dispensed to activating heat for an appropriate temperature-time period such that the tape attains its adhesive use condition attendant on and immediately following the feeding and severing steps, and is delivered conveniently to the operator's hand in its natural motion of operation of the machine in rapidly repeatable cycles.

My invention, either as to method or apparatus, is not limited to the exemplary embodiments or steps herein illustrated or described, and I set forth its scope in my following claims.

I claim:

1. Apparatus of the class described comprising support means for a continuous supply of thermosensitive tape, feeding means for extending in a path lengths of the tape from the supply, correlated automatic tape severing means for the extended tape lengths, and heated tape-receiving means in the tape path forwardly beyond the feeding and severing means for timed heating to activation and automatically delivering to the operator severed thermally adhesively conditioned tape lengths, said tape support means, feeding means and severing means constituting a first operative unit and said heated tape-receiving means constituting a second operative unit, said operative units being constructed and arranged for reciprocating tape-path-paralleling relative bodily motion of approach and retraction for direct feed of the tape into and reception by the heated receiving means attendant on said motion of relative approach and for interposing a heat transfer retarding space between said units by said motion of relative retraction.

2. Apparatus for delivering in successive operating cycles lengths of thermosensitive tape conditioned for use comprising, in combination, means supporting a tape supply of indefinite length, feed rolls to advance use lengths of tape from the supply, and plate heater means for supportively receiving and adhesively activating tape lengths fed, the heater means and the remaining non-fed tape being relatively movable bodily at each operating cycle between a position of approach to each other for reception of tape by the heater means and a position of separation from each other for preservation of relatively low temperature ambient to the remaining non-fed tape.

3. Apparatus for delivering lengths of thermo-sensitive tape conditioned for use comprising, in combination, means supporting a tape supply of indefinite length, tape feeding means, tape severing means locating the leading end of the remaining tape of the supply, heater means for receiving and adhesively activating tape lengths fed past the severing means, the heater means and the severing means being relatively movable bodily between an approached position for direct feed of a selected tape length into activation-subject relation to the heater means and a spaced position wherein the remaining tape after severance of the selected length is beyond activating range of the heater means.

4. A dispenser for thermally activatable adhesive tape comprising tape supply supporting means, means to extend tape lengths from the supply in successive operating cycles, and tape-activating heater means adapted for heat-activating influence upon the extended tape lengths, said heater means and the non-extended tape of the supply being mounted for movement of at least one of them toward and from the other in and as a part of each operating cycle for the purposes of guided delivery of the tape to the heater means and of maintenance of the non-extended tape in non-activating temperature status.

5. The method of dispensing from portable counter-type strip serving machines individual lengths of normally non-tacky heat-activatable tape from a roll supply and delivering such lengths in thermally adhesively conditioned status to the hand of an operative, comprising in combination operatively supporting the leading portion of the non-activated tape in readiness for projection from the supply along a determined longitudinal path, presenting in such path in non-heating separation from the non-activated tape an oven-like heating throat adapted to receive a tape length for directing heat to the faces thereof, relatively moving such throat and the non-activated tape along such path into relative proximity to each other, projecting the leading portion of the tape into such heating throat when the latter and the non-activated tape are in such relative proximity, severing the projected tape length, relatively retracting the heating throat and the remnant tape of the supply into initial non-heating relative separation, thermally adhesively conditioning the severed tape length while in the throat, and delivering the severed adhesively conditioned tape length laterally of the projection path to the hand of the operative.

6. In a dispenser for thermally adhesively activatable tape, a heater unit presenting a heater plate for parallel reception of a tape length from a continuous supply, a heat source for the plate, and ejector means movable adjacent and in the general plane of the plate to project the heat-activated tape into heat-safe position for ready grasping by the operator.

7. Apparatus for dispensing thermally adhesive activatable tape comprising a tape supply support, tape feeding means, tape severing means, a manual operating member having forward and return movement in an operating cycle and connected to operate the feeding and the severing means, and a heater unit to receive and thermally adhesively activate the fed and severed tape lengths, said unit including means appropriately timed relative to the operating member to project the received tape lengths from the unit when they are activated.

8. Apparatus for dispensing thermally adhesively activatable tape comprising a tape supply support, tape feeding means, tape severing means, a manual operating member having forward and return movement in an operating cycle and connected to operate the feeding and the severing means, and a heater unit to receive and thermally adhesively activate the fed and severed tape lengths, said unit mounted for bodily movement of approach to and retraction from a receiving position with respect to the feeding and the severing means, and means whereby a first non-feeding portion of the forward movement of the manual operating member moves the heater unit into said receiving position.

9. Apparatus according to claim 8 including means automatically effecting retraction of the heater unit in the course of the cycle of the manual operating member.

10. Apparatus according to claim 9 including tape ejector means on the heater unit, and timed means for operating the ejector means following retraction of the heater unit.

11. Apparatus of the class described comprising support means for a supply of thermosensitizable tape, feeding means for the tape, tape severing means, tape-receiving oven means for thermally activating and delivering severed adhesive tape lengths, the oven means and at least one of the other means being accorded relative motion of approach and retraction, and operating and control means for actuating all said means in ordered cycles for successive lengths of tape.

12. The apparatus of claim 11 wherein the operating and control means includes heating-interval timing and tape ejecting means.

13. The apparatus of claim 12 wherein the timing means includes a mechanical device actuated on relative retraction of the oven and said other means.

14. The apparatus of claim 12 wherein the timing means is electrically activated and controlled.

15. A dispensing machine for heat-sensitizable tape comprising a continuous support for a supply of the tape, means to feed successive lengths of tape from the supply past a severing station determining the leading end of the supply tape, heater means adapted to receive the fed tape flatwise and having a normal position at a heat insulating distance from the severing station, and means coordinated with the feed means preparatorily to bring the severing station and the heater means into relative proximity for tape feed to and severance at the heater means.

16. A dispensing machine according to claim 15 including a housing frame for the several means, said frame comprising bodily separable sections, one carrying the heater means and another carrying the tape supporting and feeding means and the severing station.

17. In a portable counter-type dispensing machine for heat-sensitizable tape, a tape-heating receiver adapted to accept lengths of tape, a heat source for the receiver, means operable upon heat sensitizing of the tape to project the given tape length in the plane thereof from the receiver, and retainer means to hold the tape in projected position.

18. In a portable counter-type dispensing machine for heat-sensitizable tape, means to feed tape lengths along a path longitudinal thereof from a continuous supply, a tape-heating receiver adapted to accept the tape lengths in the direction of the tape path, and means to eject the heat-sensitized tape lengths from the receiver in a direction generally in the plane of and transverse to the tape path.

19. Apparatus for dispensing from a roll supply of normally non-tacky heat-activatable tape lengths thereof thermally adhesively conditioned for use, said apparatus comprising means for operatively supporting the tape roll supply with the leading portion of the non-activated tape in readiness for projection from the supply along a determined path longitudinal of the tape, an oven-like heating throat adapted to receive a tape length for thermally adhesively conditioning a heat-activatable face thereof, means for presenting such heating throat normally in non-heating separation from the non-activated tape, means for relatively moving said heating throat and the non-activated tape into tape-transferring proximity to each other in operative alignment in the tape path, means for projecting the leading portion of the tape into said heating throat when the latter and the non-activated tape are in said relative proximity to each other, means for severing the projected tape length from the supply, return means for relatively retracting said heating throat and the remnant tape of the supply to normal non-heating relative separation, said heating throat adapted to thermally adhesively condition the severed tape length while it is present therein, and means for extending from the throat the severed adhesively conditioned tape length in position to be grasped for use.

References Cited in the file of this patent

UNITED STATES PATENTS

| | | |
|---|---|---|
| 1,061,039 | Borchert | May 6, 1913 |
| 2,114,833 | Fincke | Apr. 19, 1938 |
| 2,247,623 | Von Hofe | July 1, 1941 |
| 2,291,280 | Joplin | July 28, 1942 |
| 2,382,787 | Gautier et al. | Aug. 14, 1945 |
| 2,401,841 | Singer | June 11, 1946 |
| 2,528,856 | Caldwell | Nov. 7, 1950 |
| 2,538,520 | Holt | Jan. 16, 1951 |
| 2,569,101 | Hoppe | Sept. 25, 1951 |
| 2,625,287 | Holt et al. | Jan. 13, 1953 |
| 2,642,936 | Semler | June 23, 1953 |
| 2,645,286 | Boyd | July 14, 1953 |
| 2,672,251 | Schwartz et al. | Mar. 16, 1954 |
| 2,684,775 | Von Hofe | July 27, 1954 |
| 2,720,994 | Arvidson | Oct. 18, 1955 |
| 2,753,430 | Winberg | July 3, 1956 |